United States Patent
Ehrmaier et al.

(10) Patent No.: US 6,886,654 B1
(45) Date of Patent: May 3, 2005

(54) DEVICE FOR INCREASING THE SECURITY OF A MOTOR VEHICLE

(75) Inventors: Rudolf Ehrmaier, Munich (DE); Josef Neuner, Raubling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/936,905

(22) PCT Filed: Mar. 1, 2000

(86) PCT No.: PCT/EP00/01766
§ 371 (c)(1),
(2), (4) Date: May 1, 2002

(87) PCT Pub. No.: WO00/56578

PCT Pub. Date: Sep. 28, 2000

(30) Foreign Application Priority Data

Mar. 19, 1999 (DE) .......................... 199 12 332
Mar. 19, 1999 (DE) .......................... 199 12 331

(51) Int. Cl.$^7$ ................................. B60T 7/22
(52) U.S. Cl. .................. 180/277; 180/285; 701/69
(58) Field of Search ................. 180/277, 278, 180/282, 285, 338, 337; 701/67, 69, 70

(56) References Cited

U.S. PATENT DOCUMENTS

| | | | | |
|---|---|---|---|---|
| 5,346,032 A | * | 9/1994 | Sasaki ................. 180/233 |
| 5,362,287 A | | 11/1994 | Tanaka et al. | |
| 5,481,139 A | | 1/1996 | Lucas | |
| 5,769,752 A | * | 6/1998 | Kim ....................... 477/114 |
| 5,839,084 A | * | 11/1998 | Takasaki et al. ........ 701/67 |
| 5,931,762 A | * | 8/1999 | Koyama et al. ........ 477/143 |
| 6,022,290 A | * | 2/2000 | Lyon ................... 477/108 |
| 6,029,511 A | * | 2/2000 | Welsch et al. ........ 73/118.1 |
| 6,077,190 A | * | 6/2000 | Tabata et al. .......... 477/97 |
| 6,183,391 B1 | * | 2/2001 | Iijima ................. 477/62 |
| 6,188,946 B1 | * | 2/2001 | Suzuki et al. ......... 701/62 |
| 6,208,929 B1 | * | 3/2001 | Matsuno et al. ........ 701/89 |
| 6,368,250 B1 | * | 4/2002 | Marten et al. ......... 477/175 |
| 6,656,085 B2 | * | 12/2003 | Schmitt ............... 477/83 |
| 6,695,747 B2 | * | 2/2004 | Zimmermann et al. ... 477/123 |

FOREIGN PATENT DOCUMENTS

DE         196 35 809 A1    3/1998
DE         298 01 443 u1    6/1998

* cited by examiner

Primary Examiner—Paul N. Dickson
Assistant Examiner—Toan To
(74) Attorney, Agent, or Firm—Crowell & Moring LLP

(57) ABSTRACT

The invention relates to a device for increasing the security of a motor vehicle comprising an automatic transmission, which is impinged upon by an electrical transmission control system and a detection unit for detecting a critical driving situation and for generating a corresponding signal. In order to increases driving security, an evaluation device is provided which checks whether the generated signal has reached a specific value or exceeded a specific threshold. If said value has been reached or the threshold has been exceeded, the evaluation device causes the transmission control system to interrupt the positive engagement of the transmission.

19 Claims, 1 Drawing Sheet

DEVICE FOR INCREASING THE SECURITY OF A MOTOR VEHICLE

BACKGROUND AND SUMMARY OF THE INVENTION

The invention relates to a device for increasing the security of a vehicle, and, more particularly, to a device for increasing the security of a vehicle having an automatic transmission, which is acted upon by an electric transmission control and a detection device for detecting a critical driving situation and generating a corresponding signal.

If it is determined that vehicle security is at risk, measures should generally be taken for continuously ensuring the vehicle security. In the following, a differentiation will be made between two groups of situations with respect to the vehicle security.

On the one hand, vehicle security may relate to a stable vehicle handling. Many methods and systems for improving the directional control are known.

For example, from German patent document DE 196 35 809 A1, a method and a system are known for improving directional control in the coasting operation, in which the transmission line is interrupted by disengaging a friction clutch when the difference of the rotational wheel speeds between the driven and non-driven wheels exceeds a certain threshold value. As a result, the directional control is increased in the coasting operation.

From German patent document DE 35 28 389 A1, a corresponding system is known for a wheel slip control.

U.S. patent document U.S. Pat. No. 5,362,287 describes a control method for an automatic clutch in the case of which the transmission line is interrupted when an excessive wheel slip is detected, the wheel slip being the result of an engine braking.

In the case of automatic transmissions, it is also recommended that, when the vehicle handling is unstable or during a swerving event, the "neutral" transmission position be engaged manually in order to more rapidly return the vehicle into a stable condition. However, very few drivers are capable of removing a hand from the steering wheel during a swerving event and moving the gear selector lever to the N position.

Another group of situations is represented by driving situations in the sense of accident situations. In accident situations, it is generally provided that, for safety reasons, a vehicle is to be stopped after an accident and any further vehicle movement is to be avoided.

For solving this problem various measures are known. For example, it is possible to interrupt the ignition or the fuel supply after an air bag is triggered, which may be used as an indicator with respect to an accident. The engine is then switched off after a corresponding event. However, it is also possible to interrupt the vehicle movement in a time-delayed manner. Furthermore, there is the risk that a disturbance exists in the engine timing unit and/or there is an interference in the signal transmission from the air bag control unit to the engine timing unit.

Furthermore, an air bag control unit is known from Japanese patent document JP 10103498, which provides a signal to a transmission control when an air bag is triggered. When the air bag is triggered, the transmission control shifts the transmission into a state with a low torque output.

It is an object of the present invention to further develop a system of the above-mentioned type for increasing the security in the case of a vehicle in order to ensure the vehicle safety in every case also during accidents and swerving events.

This object is achieved by a device for increasing the security of a vehicle having an automatic transmission, which is acted upon by an electric transmission control, and a detection device for detecting an accident or a swerving event and generating a corresponding signal. An analyzing device is provided to examine whether the generated signal reaches a certain value or exceeds a certain threshold. When the value is reached or the threshold is exceeded, the analyzing device causes the transmission control to interrupt the positive engagement of the transmission.

An essential idea of certain preferred embodiments of the present invention is the fact that the positive engagement in the transmission will be interrupted when a detection unit determines an accident or a swerving situation.

According to a first embodiment of the invention, the positive engagement in the automatic transmission will be interrupted by the electric transmission control in the event swerving starting at a defined swerving intensity. In a preferred embodiment, the transmission will then be shifted into the neutral position. In this manner, it is possible to interrupt the positive engagement in the transmission line independently and in the required manner in order to ensure high directional control of the vehicle.

According to an alternative embodiment of the invention, the transmission is controlled by the electric transmission control in the event of a triggering of an air bag and/or a rollover event such that the positive engagement in the transmission is interrupted. As a result, it is ensured that continued movement of the vehicle will be prevented even if the engine continues to run. In this case, the triggering of an air bag or the rollover event are used as an indication of the occurrence of an accident. A conclusion can be drawn with respect to the triggering of an air bag either by way of monitoring a crash sensor directly or by way of the reaction of an air bag control unit. In this sense, a triggering of an air bag is assumed even when signals are detected which lead to a triggering of an air bag.

In the above context, an embodiment of special interest is in the case wherein an automatically operable parking position is provided, which is also addressed by a control unit and which will be engaged when the vehicle has come to a stop after an air bag triggering operation and/or a rollover event. For indicating and including the vehicle speed, a normally existing vehicle speed sensor can be analyzed. Naturally, the parking position can also be engaged on the basis of other criteria. Furthermore, it is possible to immediately engage the parking position when the positive engagement is interrupted because of the air bag triggering operation or the rollover event. In this context, reference is also made to German patent document DE 196 25 019 A1 in which, among other things, an automatic activating of the parking position is described. By activating the parking position, rolling-away is effectively prevented after a stoppage of the vehicle.

According to another preferred embodiment, a transmission selection device is provided which has a defined rest position and, for selecting a driving position desired by the driver, can be directed out of its rest position into which it will then automatically return. When the positive engagement is interrupted or a shifting into the neutral position takes place on the part of the transmission, the driver will not be confused by different adjustments of the transmission selection device, on the one hand, and of the transmission, on the other hand. Also, no synchronization problems occur as a result of absent detent positions.

Additional embodiments are defined in the subclaims.

Two simple embodiments of the present invention will be explained in detail with respect to the attached drawings.

DETAILED DESCRIPTION OF THE DRAWINGS

Figure 1:
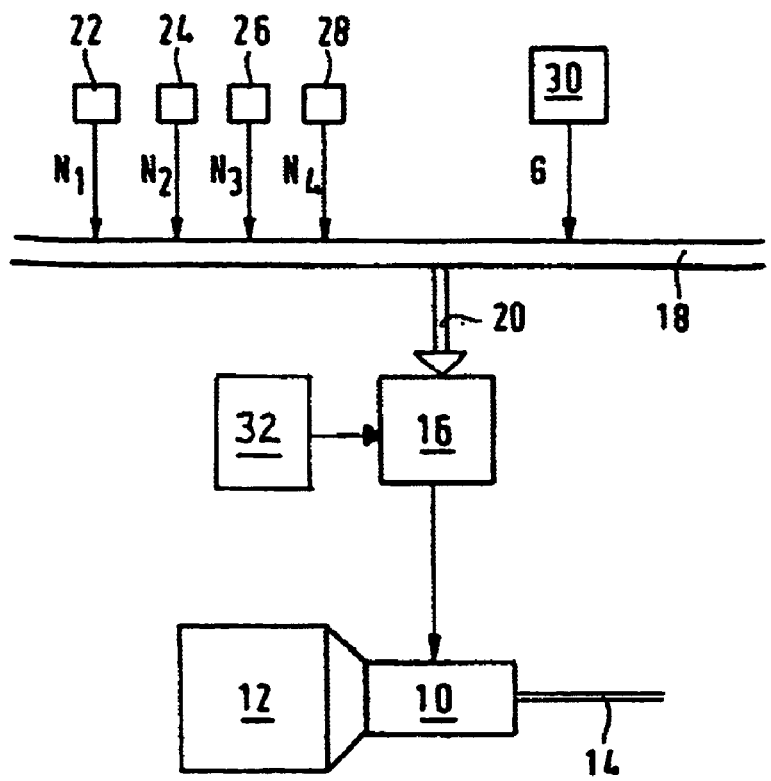
FIG. 1 is a schematic block diagram of a device for increasing the directional control according to the invention.

According to FIG. 1, an internal-combustion engine 12, which is coupled directly with a transmission 10, is arranged in a vehicle which is not shown. An output shaft 14 extends from the transmission 10 in the direction of the wheels which are not shown.

The transmission is an automatic range transmission which is shifted by means of an electric transmission control 16. The transmission control 16 receives its input information from a bus 18 (such as a CAN bus). It has an interface which is not described in detail and which is coupled with the bus 18 (reference number 20) and which filters the required information out of the information present on the bus.

In the first embodiment, information concerning rotational wheel speeds $N_1$ to $N_4$ is present on the bus 20, which is fed into the bus 18 by corresponding rotational wheel speed sensors 22 to 28. In addition, information concerning the yaw rate G is present on the bus 20, which yaw rate G is fed by a yaw sensor 30.

The electric transmission control 16 continuously determines a swerve value from the signals $N_1$ to $N_4$ and G and compares this swerve value with a limit value stored in the transmission control 16. If the swerve value exceeds the defined limit value, the transmission 10 shifts into its neutral position whereby the positive engagement in the transmission line is interrupted.

As an alternative, the signals of other sensors or detection devices which permit a conclusion with respect to a swerving event can naturally also be analyzed.

In certain critical situations in which an interruption of the transmission line is helpful, the driver must therefore no longer manually shift the transmission into the neutral position. On the contrary, this is carried out by the vehicle itself.

Figure 2:
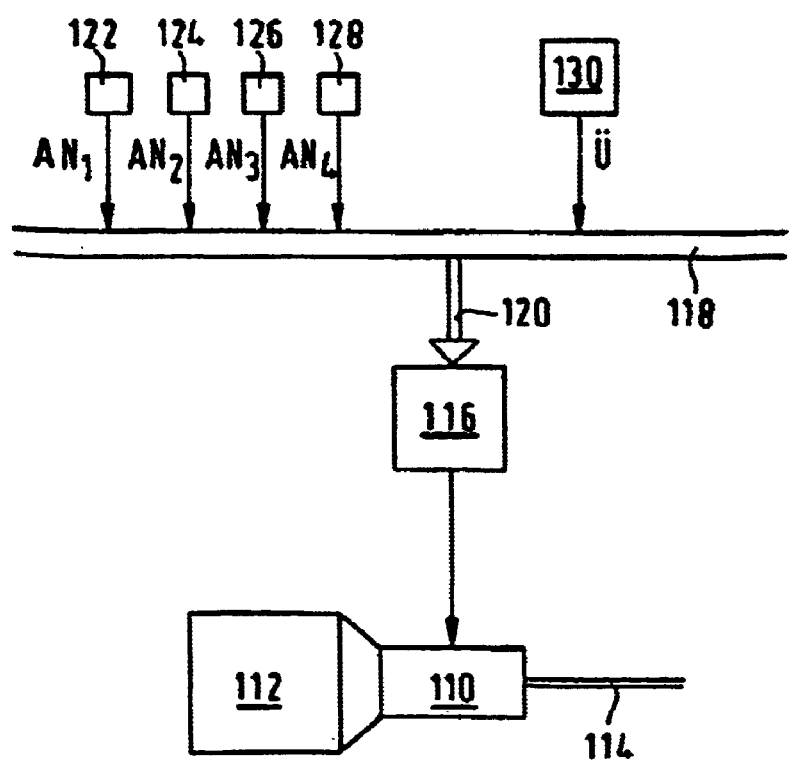
FIG. 2 is a schematic block diagram of a second embodiment of the device according to the invention for increasing the security.

An alternative embodiment of the invention is illustrated in FIG. 2. In this case, an internal-combustion engine 112 is arranged in a vehicle, which is also not shown. This internal-combustion engine 112 is again directly coupled with a transmission 110. An output shaft 114 extends from the transmission 110 in the direction of the wheels which are not shown.

The transmission 114 is an automatic range transmission which is shifted by means of an electric transmission control 116. The transmission control 116 receives its input information from a bus 118. The transmission control 116 has an interface 120 which is not described in detail and which is coupled with the bus 118 and filters the required information out of the information present on the bus 118.

In a second embodiment, information concerning air bag triggering events, specifically signals $AN_1$ to $AN_4$, are present on the bus 120. These signals are fed by corresponding air bag triggering devices 122 to 128, for example, crash sensors or an air bag control unit, into the bus 118. Furthermore, information concerning a rollover event Ü is present on the bus 120, which information is fed by a rollover sensor 130.

The electric transmission control 116 now continuously monitors the existing air bag triggering and rollover signals. When a triggering of an air bag or a rollover event is detected, the transmission 110 is shifted such that its positive engagement is interrupted. Thus, no more torque is transmitted from the engine 112 to the driving wheels and a continued movement of the vehicle is effectively prevented.

As an alternative, naturally the signals of other sensors or detection devices can also be analyzed, from which a conclusion can then be drawn with respect to a situation in which the positive engagement in the transmission should be interrupted.

In critical situations in which an interruption of the positive engagement in the transmission line or in the transmission is helpful, the driver therefore no longer has to manually shift the transmission into the neutral position. On the contrary, the vehicle itself achieves an interruption of the transmission line and, as a further development, a locking of the wheels.

Another embodiment of the invention includes the previously discussed gear selection device for selecting a driving position desired by the driver, having a rest position to which the device automatically returns after the driver selects the desired driving position. As shown in FIG. 1, gear selection device 32 provides a driving position input to the transmission control 16. Alternatively, the driving position input may be indirectly routed from gear selection device 32 to transmission control 16, for example, through bus 18.

Since the above-mentioned applications can be implemented by a corresponding modification of the transmission software, a particularly cost-effective implementation is possible.

What is claimed is:

1. A device for increasing security of a motor vehicle, comprising:
    an automatic transmission;
    an electric transmission control operatively coupled with the automatic transmission;
    a detection device that detects a parameter of one of an accident and swerving event of the vehicle and generates a signal corresponding to the parameter;
    an analyzing device that evaluates whether the signal reaches a specific value or exceeds a specific threshold corresponding to presence of the accident or swerving event, said analyzing device causing the electric transmission control to interrupt a positive engagement of the automatic transmission by shifting the automatic transmission into a neutral position when the specific value is reached or the specific threshold is exceeded.

2. The device according to claim 1, wherein the detection device is part of an air bag triggering device, said analyzing device causing the interruption of the positive engagement when a triggering of an air bag or a signal that leads to the triggering of the air bag is detected.

3. The device according to claim 2, wherein the part of the air bag triggering device comprises at least one of a crash sensor and an air bag control unit that provides signals used for triggering the air bag.

4. The device according to claim 3, wherein the detection device also includes a rollover sensor, the positive engagement being interrupted when a rollover event is detected.

5. The device according to claim 3, further comprising an automatic parking position system, said automatic parking position system being activated when the positive engagement of the transmission is interrupted.

6. The device according to claim 2, wherein the detection device also includes a rollover sensor, the positive engagement being interrupted when a rollover event is detected.

7. The device according to claim 2, further comprising an automatic parking position system, said automatic parking position system being activated when the positive engagement of the transmission is interrupted.

8. The device according to claim 7, further comprising a vehicle speed sensor, said automatic parking position system being activated when, in addition to the interruption of the positive engagement, the vehicle speed is substantially zero.

9. The device according to claim 1, wherein the detection device is a rollover sensor, the positive engagement being interrupted when a rollover event is detected.

10. The device according to claim 9, further comprising an automatic parking position system, said automatic parking position system being activated when the positive engagement of the transmission is interrupted.

11. The device according to claim 1, wherein the detection device generates a value describing the swerving event, said analyzing device causing the interruption of the positive engagement of the transmission when the swerving event value exceeds a specific threshold value.

12. The device according to claim 11, wherein the detection device includes at least one of rotational wheel speed sensors and a yaw rate sensor.

13. The device according to claim 1, wherein the detection device includes at least one of rotational wheel speed sensors and a yaw rate sensor.

14. The device according to claim 1, wherein said analyzing device is integrated into the electric transmission control.

15. The device according to claim 1, further comprising a gear selection device having a defined rest position, said gear selection device being directed out of the rest position in order to select a driving position desired by the driver and then being automatically returned.

16. A method for increasing security of a vehicle having an automatic transmission operatively coupled with an electric transmission control, the method comprising the acts of:

detecting one of an accident and a swerving event of the vehicle;

generating a signal value associated with the accident or swerving event;

evaluating the signal value to determine whether it reaches a specific value or exceeds a specific threshold; and interrupting the positive engagement of the automatic transmission by shifting the automatic transmission into a neutral position when the specific value is reached or the specific threshold is exceeded.

17. The method according to claim 16, wherein the act of detecting the accident is carried out by determining whether an air bag is triggered or whether a signal leading to the triggering of the air bag is detected.

18. The method according to claim 17, further comprising the act of activating an automatic parking position system when the positive engagement of the transmission is interrupted.

19. The method according to claim 16, wherein the act of detecting the swerving event is carried out by analyzing signals from at least one of rotational wheel speed sensors and a yaw rate sensor of the vehicle.

* * * * *